(12) United States Patent
Chen et al.

(10) Patent No.: US 10,022,676 B2
(45) Date of Patent: Jul. 17, 2018

(54) MAGNETIC NANOTUBE COMPOSITE MEMBRANES

(71) Applicants: Xing Chen, Plainfield, IL (US); Patricia Ignacio-De Leon, Naperville, IL (US); Emily Jane Rabe, Hawthorn Woods, IL (US); Meltem Urgun-Demirtas, Naperville, IL (US); Richard W. Brotzman, Naperville, IL (US)

(72) Inventors: Xing Chen, Plainfield, IL (US); Patricia Ignacio-De Leon, Naperville, IL (US); Emily Jane Rabe, Hawthorn Woods, IL (US); Meltem Urgun-Demirtas, Naperville, IL (US); Richard W. Brotzman, Naperville, IL (US)

(73) Assignee: UCHICAGO ARGONNE, LLC, Chicago, IL (US)

(*) Notice: Subject to any disclaimer, the term of this patent is extended or adjusted under 35 U.S.C. 154(b) by 90 days.

(21) Appl. No.: 15/000,801

(22) Filed: Jan. 19, 2016

(65) Prior Publication Data
US 2017/0203256 A1    Jul. 20, 2017

(51) Int. Cl.
*B01D 69/04*    (2006.01)
*B01D 67/00*    (2006.01)
*B01D 71/56*    (2006.01)
*B01D 71/02*    (2006.01)

(52) U.S. Cl.
CPC ....... *B01D 69/043* (2013.01); *B01D 67/0079* (2013.01); *B01D 67/0093* (2013.01); *B01D 71/021* (2013.01); *B01D 71/024* (2013.01); *B01D 71/56* (2013.01); *B01D 2323/35* (2013.01); *B01D 2325/20* (2013.01); *B01D 2325/36* (2013.01)

(58) Field of Classification Search
None
See application file for complete search history.

(56) References Cited

U.S. PATENT DOCUMENTS

| | | | |
|---|---|---|---|
| 7,611,628 B1 * | 11/2009 | Hinds, III | A61N 1/0412 210/490 |
| 2005/0169830 A1 | 8/2005 | Richard et al. | |
| 2009/0214847 A1 | 8/2009 | Maruyama et al. | |
| 2010/0062156 A1 * | 3/2010 | Kurth | B01D 61/002 427/243 |

FOREIGN PATENT DOCUMENTS

WO    WO2010126686    11/2010

* cited by examiner

*Primary Examiner* — Krishnan S Menon
(74) *Attorney, Agent, or Firm* — Cherskov Flaynik & Gurda, LLC

(57) ABSTRACT

The invention provides a membrane comprising tubes extending through a polymer, wherein substantially all of the tubes are parallel with each other. Also provided is a method for producing a membrane, the method comprising: placing tubes on a substrate, subjecting the tubes to a magnetic field for a time and at a magnetic field strength to cause the tubes to align parallel with each other while simultaneously causing depending ends of the tubes to embed within the substrate; applying polymer to the tubes and substrate in an amount to affix the tubes relative to each other and relative to the substrate, and applying an etchant that cleaves a specific type of the bonds within the polymer to unblock the upstream ends of the nanotubes.

14 Claims, 3 Drawing Sheets

MAGNETIC NANOTUBE COMPOSITE MEMBRANES

The U.S. Government has rights in this invention pursuant to Contract No. DE-AC02-06CH11357 between the U.S. Department of Energy and UChicago Argonne, LLC, representing Argonne National Laboratory.

BACKGROUND OF THE INVENTION

1. Field of the Invention

This invention relates to membrane filtration systems and more specifically, this invention relates to a membrane filter construct and a method for producing the construct utilizing magnetic nanometer-sized tubes.

2. Background of the Invention

The need for energy-efficient water treatment and purification methods and systems is increasing with the rising demand for clean drinking water. Ultrafiltration produces high quality water without requiring high pressures.

Carbon nanotube systems have been attempted to achieve this high filtration. Unfortunately, for maximum effect, the tubes must be grown vertically from nanoparticle catalysts. The catalysts must then be removed before the resulting membrane filtration device can be utilized.

A need exists in the art for a filtration construct and a method for producing the construct that is low labor intensive. The construct and method should be reproducible and enable highly efficient separations at pressures as low as 1 atmosphere.

SUMMARY OF INVENTION

An object of the invention is to provide a membrane to facilitate efficient water treatment and purification that overcomes many of the drawbacks of the prior art.

Another object of the invention is to provide an ultrafiltration membrane. A feature of the membrane is magnetic nanotubes embedded in a polymer, wherein the tubes are substantially all parallel with each other. An advantage of the membrane is that is confers a 5 to 10 fold increase in efficiencies for removing contaminants, such as lignin in wastewater.

Still another object of invention is to provide an ultra filtration system. A feature of the invention is its utilization of nanotubes with aspect ratios as high as 10,000. An advantage of the system is that the high aspect ratio enables the tubes to be imbedded in a substrate for use as pores or nanochannels.

Yet another object of the invention is to provide a method for producing an ultrafiltration membrane. A feature of the invention is the use of magnetic fields to align ferrous nanotubes prior to permanent positioning of the tubes via interfacial polymerization. An advantage of the method is that the application of the magnetic field is relatively easy, compared to the labor intensive methods of alignment seen in state of the art methods.

Briefly, the invention provides a membrane comprising magnetizable tubes extending through a polymer, wherein substantially all of the tubes are parallel with each other.

Also provided is a method for producing a membrane, the method comprising: placing magnetizable tubes on a substrate, subjecting the tubes to a magnetic field for a time and at a magnetic field strength to cause the tubes to align parallel with each other while simultaneously causing depending ends of the tubes to embed within the substrate; applying polymer to the tubes and substrate in an amount to affix the tubes relative to each other and relative to the substrate, and etching the polymer using an enzyme that cleaves specific types of bonds within the polymer to unblock the upstream ends of the nanotubes.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invention provides a membrane comprising a plurality of nanotubes, substantially all aligned parallel to each other. The diameters of the nanotubes provide filtration via size exclusion, and via separation based on chemical interactions between solute and surfaces of the tubes. Such interactions include, but are not limited to electrostatic exclusion, (i.e. like-charged solutes are repelled, oppositelycharged are preferentially transported), preferential adsorption of one solute over others due to favorable interactions with nanotube walls, etc.

Figure 3:
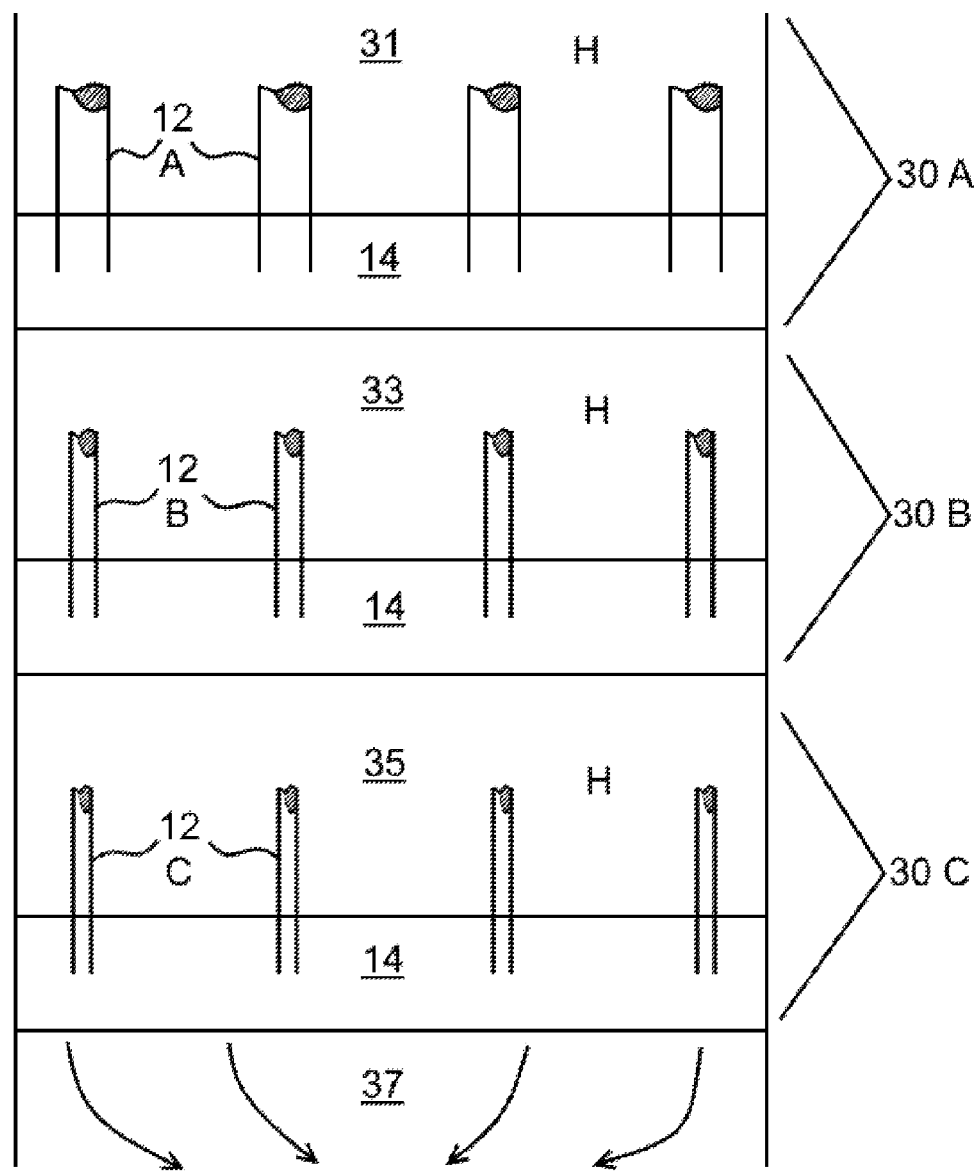
FIG. 3 is a schematic depiction of a filtration construct comprising a plurality of filtration modules, in accordance with features of the present invention.

The invented membrane construct can be used in modular fashion, so as to be stacked on top of similar constructed membranes having different tube diameters, as discussed infra in conjunction with FIG. 3.

Figure 1:
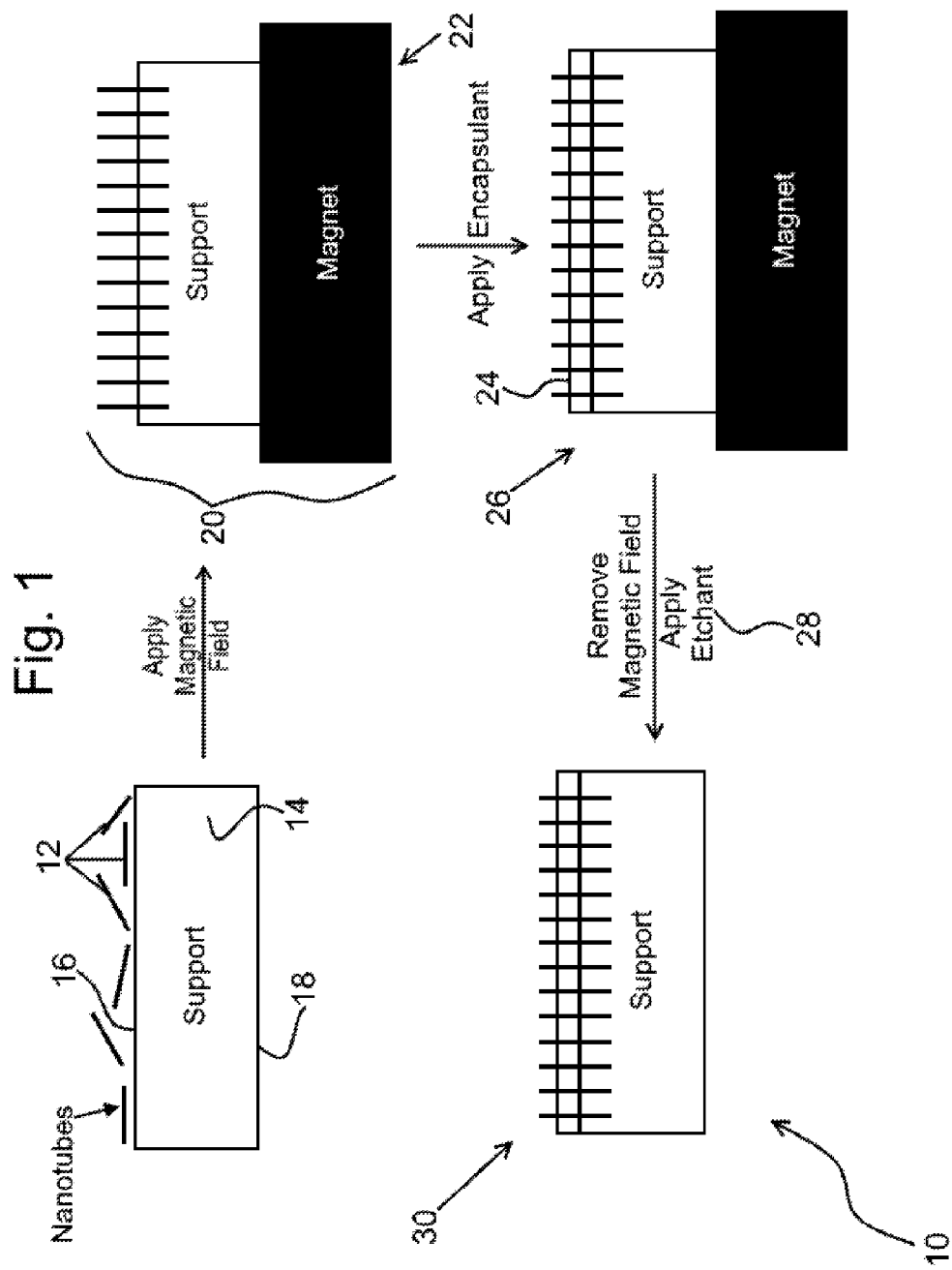
FIG. 1 is a schematic diagram of fabrication of nanocomposite membranes, in accordance with features of the present invention.

An embodiment of the method is depicted as numeral 10 in FIG. 1. Magnetic nanotubes 12 each defining a longitudinal axis a are first placed on a support substrate 14 defining a first upwardly facing surface 16 and a second downwardly facing surface 18. FIG. 1, for illustrative purposes, depicts a substantially flat support substrate 14. However, nonflat substrates are also suitable. Alternatively, supports are chosen for their flexibility such that filters constructed on even flat support substrates 14 can be bent to conform to filter housings, nacelles, and other constraints.

After the magnetic tubes 12 are placed upon the substrate 14, a magnetic field 20 is applied for a time and at a strength sufficient to cause the longitudinal axes of the nanotubes to align perpendicularly with the support substrate 14. Packing density (i.e. number of nanotubes per unit area on the surface of the membrane) is dictated by the concentration of the nanotube dispersion, (for example, 0.05 weight % in water, or 50 mg nanotubes per 100 mL water) and the actual volume of the dispersion (e.g. typically 5 mL) employed during membrane fabrication. The maximum possible packing density for nanotubes of outer diameter 35 nm (25 nm inner diameter) is about $1.04 \times 10^8$ nanotubes/cm$^2$. This corresponds to 2.8 microgram ($2.8 \times 10^{-3}$ mg) per a commercially available support which has a 47 mm diameter.

Generally, in the presence of an applied magnetic field, the long axes of the magnetic nanotubes align parallel to the field lines of the field and perpendicular to the surface of the support substrate 14. Magnetic field strengths between approximately one-quarter Tesla (T) and approximately 25 T can be utilized. However, magnetic fields as low as about one-half T provide suitable results.

As can be seen in FIG. 1, upon application of the magnetic field, the depending ends of the tubes 12 embed within the substrate 14 to create a construct 22. In this configuration, the periphery of the depending ends of the tubes 12 are not in fluid communication with the upwardly facing surface 16 of the substrate 14. This is made possible inasmuch as the substrates 12 are chosen based on a predetermined porosity such that pores in the substrate extend transversely through the substrate. This enables the tubes to align within the proximal (i.e. the upstream) ends of the substrate's pores.

In an embodiment of the invention, substantially all (e.g., more than about 90 percent) of the tubes are parallel with each other within the same construct. However, ranges of alignment can vary from between about 40 percent to 100 percent of the tubes being parallel with each other, with between about 75 percent and 85 percent alignment preferred. In another embodiment of the invention at least 95 percent of the tubes are parallel with each other.

Once the tubes are aligned, an encapsulant 24 (such as a polyamide) is applied to the proximal or upwardly facing side of the tube-substrate construct 22. The encapsulant is applied in amounts to substantially anchor the tubes 12 to the upwardly facing surface of the substrate 14. The encapsulant also aids in providing a hermetic seal between longitudinally extending regions of the tubes in close spatial relationship to the depending ends (e.g. downstream ends) of the tubes 12 and the upwardly facing surface of the substrate 14. The encapsulant, once cured in place, provides a means for maintaining alignment of the tubes 12 with the pores of the substrate when the magnetic field is removed.

In an embodiment of the invention, the encapsulant defines a conformal layer across the entire upstream facing surface of the support such that fluid communication between the support and regions above the support are prevented without the fluid conduits represented by the tubes. In summary of this point, the encapsulant layer seals the support such that any of its pores not containing the tubes are blocked or otherwise prevented from accepting fluid.

After the encapsulant hardens, a rigidified construct 26 results.

In an embodiment of the method, during curing of the encapsulant, a magnetic field is maintained to prevent invasion of encapsulant into the depending (i.e., downstream) end of the tube.

After the encapsulant cures or otherwise irreversibly sets the tubes in place, the magnetic field is no longer needed to maintain alignment, and is therefore removed.

An etchant 28 is applied to the rigidified construct to remove any wayward encapsulant that has clogged, blocked or otherwise occluded the upwardly facing tube ends. This etchant treatment yields a final construct 30 comprising a plurality of nanotubes, each of the tubes arranged in parallel with each other, and orthogonal to an anchoring substrate, whereby the tubes provide fluid passage from one side of the substrate, through the substrate, to the opposite side of the substrate.

In an embodiment of the method, the entire, rigidified construct is immersed in the etchant. The etchant utilized is a protease which dissolves the polyamide responsible for the formation of the permselective layer rigidifying the construct. In this way, the etchant selectively disrupts the bonds between initial monomers constituting the polyamide encapsulant. This dissolution only occurs at the interface where the etchant is contacting the polyamide (i.e., occurring at the upstream end of the tubes). In this way, the entire rigid construct is not adversely effected with etchant treatment. The etchant, due to the proteases' molecular size (18-23 kDa), does not diffuse through the polyamide encapsulant. Polyamide encapsulant which is not in contact with the etchant (i.e. further away from the surface) is not dissolved. By controlling the duration (time) of immersion of constructs in the etchant solution, the remaining thickness of unetched polyamide is controlled.

The resulting construct can be utilized in membrane filtration applications wherein fluid pressures up to about 100 psi are present. Preferably, the construct is utilized in operating pressures ranging from between about 1 atmosphere (14.7 psi) to about 5 atmospheres (73-75 psi). A feature of the invention is that very low pressures, such as those ranging from between about 1 atm to about 2 atm are suitable operating pressures. Surprisingly and unexpectedly, the inventors found a 10 fold increase in flux rate with their invented construct compared to flux rates yielded by state of the art filters using the same operating pressures. Generally, the invented membranes provided flux rates between approximately 0.1 and approximately 100 L/m$^2$-h, for example between approximately 1 and approximately 51 L/m$^2$-h at pressures of between approximately 15 psi and approximately 65 psi. An embodiment of the invention provided flux rates of between approximately 1.2 and 50.9 L/m2-h at pressures of between approximately 15 psi and approximately 65 psi.

Nanotube Detail

Initially, the tubes can be generated having aspect ratios as high as 10,000. In some embodiments, the tubes are shortened to about less than 10 nanometers (about 5-7 nm on average) so as not to make the whole composite too thick. Thinner membranes confer less mass transfer resistance and require lower operating pressures. The encapsulating polyamide (formed via interfacial polymerization between an amine and an acyl chloride) is likewise maintained at thicknesses lower than the nanotube length so as to ensure that nanotube ends remain open. Considering the original thickness of the commercially available support (typically about 150 micron or 150,000 nm), addition of a 10 nm (or less) layer does not significantly change overall thickness.

Generally, thicknesses of the entire construct are less than 200 microns, preferably between about 25 and 150 microns, and most preferably between about 40 and 80 microns. The whole construct is highly reversibly flexible such that the membrane can be curved, rolled or even folded such that its diametrically opposing edges can be brought in physical contact with each other without damaging any of its components, its capabilities or the engineered functionalities of the nanotubes.

As noted supra, nanotube lengths can range from between about 1 micron and 100 microns, preferably 25 to 75 microns and most preferably from 40 to 60 microns. Shorter tubes (e.g. 10-50 microns) requires less pressure to provide efficient filtration compared to longer tubes. Conversely, longer tubes provide further utility as means for storing or sequestering hydrogen or other reactive moieties, or in providing a means for a measured release of reactant or fuels for subsequent combustion or mixture with reductant or oxidant.

Interior surfaces of the tubes can be functionalized via the application of atomic layer deposition so as to confer redox capabilities, gas purification and fluid treatment. Such functionalization may result in a film application along longitudinally extending interior surfaces of the tubes, such that the films are between about one-tenth and one nanometer in thickness. Generally, tube diameters range from about one-half to about 100 nanometers.

Tubes may be manufactured per the protocol provided infra so as to be hydrophilic, hydrophobic, or a combination of these characteristics. For example, aside from hydrophilic metal-containing tubes (e.g. cobalt-oxide) utilized, hydrophobic tubes, such as substantially graphite nanotubes can be employed, and functionalized as hydrophilic constructs. Generally, tubes utilized herein are comprised of magnetizable material (i.e. ferrous materials and metal materials), such as compounds selected from the group consisting of iron cobalt oxide, iron oxide (magnetite), cobalt oxide, iron, cobalt, iron cobalt, functionalized carbon, and combinations thereof. This allows for the invented constructs to process both aqueous and non-aqueous fluid streams. As such, the magnetic nanotubes constructed hereby differ greatly from carbon nanotubes in the state of the art. Whereas state of the art nanotubes display very small saturation magnetizations (generally less than 1 electromagnetic units per gram, emu/g defined infra, and typically less than 0.1 emu/g) the tube formulation protocol disclosed herein is capable of generating magnetic tubes with saturation magnetization values up to 200 times greater.

Furthermore, a plurality of constructs may be used in parallel or in serial fashion whereby a group of constructs comprise hydrophilic tubes and a second group of constructs comprise hydrophobic tubes.

Polymer Detail

A myriad of polymers are suitable, including, but not limited to amines, activated carboxylic acids (e.g. acyl chlorides, acyl phosphates, conjugates with N-hydroxysuccinimide, etc.). Polymers are chosen with low viscosities. These low viscosities (between about 0.2 centipoise (cp) and about 2 cp, preferably between 0.3 cp and 1 cp) facilitate rearrangement of magnetic nanotubes in response to an applied magnetic field. Dissolved monomers and dissolved polymer chains are suitable polymer types, with dissolved monomers less viscous. For example, to maintain alignment and to retain the nanotubes within the permselective layer 14, a polyamide encapsulant 24 is applied via interfacial polymerization between amine ("m" in chemical structure below) and acyl chloride monomers ("n" in structure below) from immiscible solvents (e.g. water and hexane). Specifically, the acyl chloride monomer is dissolved in hexane at a concentration of 0.125 weight % (i.e. 125 mg acyl chloride/ 100 mL hexane) while the amine is dissolved in water at concentration of 0.15 weight % in water. These values are too low to affect the viscosities of neat solvents, 0.3 cP for hexane and 1 cP for water at 25° C.

Nonporous polyamide results from interfacial polymerization between a nonpolar phase (acyl chloride in hexane) and a polar aqueous phase containing amine.

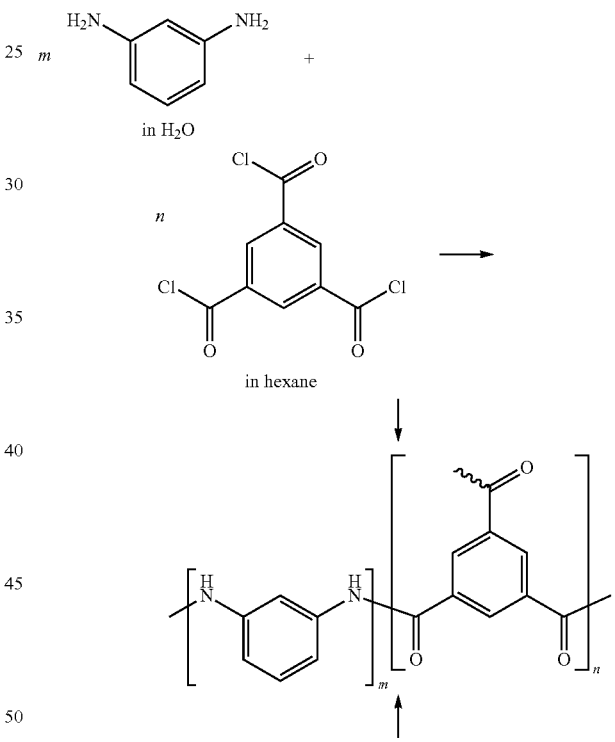

To ensure that the upstream ends of the nanotubes remain unblocked, the resulting nanocomposite membranes are treated post-synthesis with an enzyme that cleaves one of the bonds of the polymer. For example, Protease E is utilized to cleave the resulting polymer at the bond (see arrows in the resulting polymer structure above) attaching the carbonyl group to the amine group, given that enzyme's ability to cleave amide bonds. Protease E activity is quenched by addition of cold EDTA solution.

Substrate Detail

Process temperatures for producing the membrane can be room temperature (e.g. between approximately 10° C. and approximately 30° C.).

A myriad of microporous supports are suitable for use as the foundation substrate for the membrane. Suitable microporous supports include, but are not limited to, polysulfone, regenerated cellulose, poly(ethylene terephthalate) (PET), polyamide, alumina (e.g. anodic aluminum oxide), porous silica, and combinations thereof. In an embodiment of the invention, the foundation substrate is capable of a radius of curvature of between about 0 and 2.5 mm (i.e. if the construct was to be rolled into a cylinder or conduit, the smallest conduit diameter is about 5 mm). Porosities between 25 and 250 nm are suitable, with those between about 50 nm and 100 nm preferable.

Figure 2:
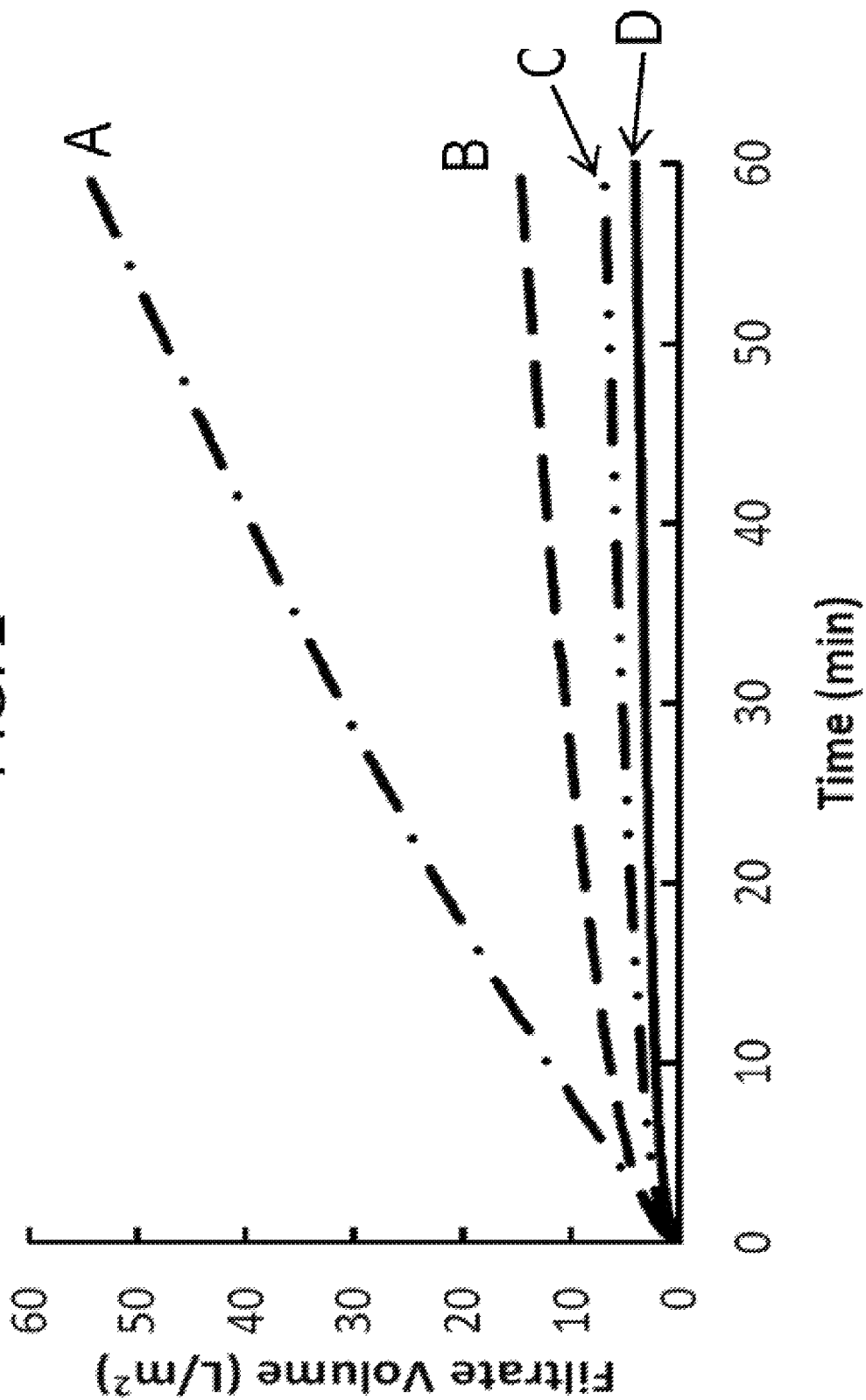
FIG. 2 is graph of flux values, in accordance with features of the present invention.

FIG. 2 shows the effect of aligned tubes, compared to substrate with nonaligned tubes, compared to substrate with no tubes, compared to polymer only. The graph shows highest flux rates for purely polyether sulfone "A". The next highest flux rates were observed for the invented membrane, which is to say nanotubes aligned on the substrate and affixed with polymer "B". The next highest flux rates were observed for substrates wherein nanotubes were randomly arranged "C". Finally, the lowest flux rate was observed for polyamide only, sans any tubes "D".

FIG. 2 shows a flux rate of up to approximately 15 liters per square meter for the invented construct over a course of 60 minutes. This compares to a flux rate of approximately 5 liters per square meter in constructs comprising nonaligned nanotubes.

Example 1

$Fe(NO_3)_3 \cdot 9H_2O$, $Co(NO_3)_2 \cdot 6H_2O$, $NaOAc \cdot 3H_2O$, $Ca(OAc)_2 \cdot H_2O$, $Na_2Y \cdot 2H_2O$ (EDTA), solvents N,N-dimethylformamide and hexane, and other organic components polyvinylpyrrolidone (PVP, MW 1,300,000), trimesoyl chloride, m-phenylenediamine, lignin (MW 10 kDa, alkali, low sulfonate content) and protease from *Streptomyces griseus* (Sigma-Aldrich) were all used as received. Polyethersulfone (PESU) membranes with 47 mm diameter and nominal 0.1 μm pore size (Sartorius Stedim) were soaked in deionized water prior to use as support for nanocomposite membrane fabrication or for filtration tests.

A NdFeB magnet with 0.5 T magnetic field strength was contained in a home-made holder and used for magnetic nanotube alignment. A solvent-resistant stirred cell (EMD Millipore) attached to a 1-gallon pressure-dispensing vessel was used for filtration tests. A Hach DR 6000 model was used for all UV-Visible spectroscopic measurements. A JEM-2100F was used to obtain transmission electron microscope (TEM) images. An FEI Quanta 400F was used to collect scanning electron microscopy images. A Hielscher UP100 H ultrasonic processor was used for all sonication purposes.

Nanotubes production. $Fe_2CoO_4$ nanotubes were prepared using an in-house instrument with integrated electrospinning, heating and pneumatic collection of engineered nanomaterials. A process for producing the nanotubes can be found in the applicant's U.S. patent application Ser. No. 14/803,339, filed on Jul. 20, 2015, and the entirety of which is incorporated herein by reference. Briefly, a precursor solution consisting of 5 wt % PVP, 5 wt % total salts (2:1 atomic ratio Fe:Co salts) in 1:1 DMF:IPA was dispensed at room temperature at a rate of 0.2 mL/hour by a syringe pump through five blunt needles biased at +30 kV onto a grounded wire wheel rotating at 0.075 rpm. Deposited electrospun fibers immediately undergo direct heat treatment using an infrared (IR) furnace powered at 1300 W (calibrated to approximately 450° C.) located opposite from the precursor source. MNTs produced as such were collected using a pneumatic trough placed directly under the wire wheel. The whole assembly is contained in a polycarbonate glove box maintained at a low oxygen atmosphere. For example, a suitable atmosphere comprises less than about 15% oxygen levels maintained via constant $N_2$ purging at 25-30 SCFH.

Composite Membrane

Preparation Detail

PESU supports pre-soaked in water were first immersed in a dilute (e.g. 0.15 wt percent) aqueous solution of m-phenylenediamine. In a separate container, MNTs were dispersed in water (0.05 wt %) via sonication at 100% amplitude (100 W, 30 kHz) for variable time depending on the desired nanotube length (e.g. 1.5 to 2 minutes for average nanotube length of 7 μm). To prepare vertically-aligned MNT composites, the amine-saturated PESU support was transferred onto a weighing boat which is placed atop a magnet. The nanotube suspension was added drop-wise onto the PESU support, followed by slow and gentle addition of a hexane solution containing 0.125 wt % trimesoyl chloride to minimize perturbation of the nanotubes. A polyamide film immediately forms, and the nanocomposite membrane is allowed to dry overnight atop the magnet. Control nanocomposite membranes prepared without an applied magnetic field and without nanotubes (i.e. polyamide alone) were also fabricated following this general procedure.

Control of polyamide thickness. Post-synthesis treatment of dried nanocomposite membranes were performed by immersing samples in a dilute solution of Protease E in a 0.01 M NaOAc with 0.005 M $Ca(OAc)_2$ buffer at pH 7.5. Membranes were shaken at 165 rpm at 37° C. and the etching reaction quenched by addition of a 0.01 M EDTA solution. To optimize polyamide etching, enzyme concentrations were varied from 1 to 500 μM as well as etching times from 5 seconds to 20 min. Etched membranes were washed repeatedly with deionized water to ensure complete removal of proteins and salts, followed by air-drying. In an embodiment of the invention, shaking the membranes (as opposed to stirring them) facilitated uniform etching across the surface of the support and encapsulant and prevented uneven pitting through the polyamide encapsulant.

In an embodiment of the invented membrane, magnetic nanotubes are arranged so that some of them are contacting each other. In other embodiments, the magnetic nanotubes are arranged such that they are not contacting each other. In this later scenario, fewer tubes confer more control during filtration procedures. Also, relatively fewer tubes and more polymer on a weight percent basis (e.g., wherein the tubes are not contacting each other) confer greater flexibility of the entire filtration module compared those modules where tube density is so high that some tubes are contacting each other.

Generally, the magnetic nanotubes exhibit a saturation magnetization of between about 20 electromagnetic unit per gram (emu/g) and about 220 emu/g, (e.g., wherein 1 emu indicates a magnetic moment such as 1 erg/gram).

A salient feature of the invented magnetic nanotubes is that they can be more precisely aligned on the foundation substrate, given their magnetic properties, compared to plain carbon nanotubes which are not magnetic, or magnetizable. This is due to the metal constituents (e.g. metal oxides and salts) of the magnetic tubes 12 being homogeneously dispersed throughout the tube structure. This homogenous dispersion throughout the length of the tubes, (and the tube length) confers the anisotropic magnetic properties which make the tubes manipulatable or tunable with applied magnetic fields.

Extent of manipulation or aligning of the tubes will further depend on the type of metal incorporated in the tubes 12 and the strength of the magnetic field applied. Generally, transition metals (e.g., iron, cobalt, nickel, zinc, boron, cobalt iron oxides, yttrium iron garnet) are constituents of tubes 12 when encapsulants of a certain viscosity are utilized such that relatively weaker magnetic fields are applied. When stronger magnetic fields are applied, and particularly if more viscous encapsulants (e.g., UV-curable polymers) are present, saturation magnetization of the metal constituents take place whereby the individual metal moieties align with the magnetic field, but that alignment is not enough to physically align the longitudinal axis of the entire tubes.

Conversely, hard magnetic metals and groupings (iron-platinum, samarium-cobalt, cobalt-platinum, neodymium-iron-boron) may be utilized when higher viscosity encapsulants are required inasmuch as these tubes align both magnetic dipole moment-wise, and tube longitudinal axis-wise compared to the more easily saturated transition metals. In these higher viscosity fabrication scenarios, higher strength magnets can be utilized to effect the physical alignment of the hard magnetic tubes. A wider range of magnetic fields strengths can thus be utilized when hard-magnetic tubes are present.

Membrane Performance Testing.

All membranes tested for filtration performance were initially soaked in deionized water. All membrane filtration tests were performed at ambient temperature and an operating pressure of 40 psi from a $N_2$ cylinder. Flux measurements were achieved by automatically recording the mass of the filtrate collected every 5 s using an Ohaus Navigator balance interfaced to a computer via HyperTerminal. Feed solutions tested include pure water, 1000 and 10,000 ppm lignin solutions. Lignin % rejection values were calculated from measurements of lignin concentration in the filtrate via UV-Vis spectroscopy from a calibration curve at a local Amax 280 nm. Flux and lignin % rejection values were averaged from repeated trials and evaluated for at least three different samples for each membrane type tested (bare support, polyamide only, and with nanotubes added with or without the presence of a magnetic field).

In summary, the invention teaches the preparation of densely packed arrays of magnetic nanotubes parallel to each other and perpendicular to a membrane support. The result is a membrane that maximizes flux rates at heretofore unworkably inadequate pressure values. This leads to improved energy saving and improved percent solute rejection values.

The invention is the basis of a novel, high-throughput manufacturing process for producing nanostructured composite membranes useful for applications such as water treatment, purification and desalination, nanofiltration, gas separation, and combined catalytic transformation to and separation of products from reactants. For example, the metal oxide nanotubes incorporated in the nanocomposite membranes may be reduced to yield metal nanopores with high catalytic activity. Alternatively, the interior surfaces of the hollow nanotubes may also be functionalized or otherwise modified via atomic layer deposition to provide an additional handle for manipulating size selectivity (for desalination).

As noted supra, the invented membrane construct can be utilized as a filtration module, such that when a plurality of modules are positioned in close spatial relationship to each other, the multi-module construct provides stepwise filtration of a multi-component fluid.

FIG. 3 depicts a multi-module construct whereby a plurality of membranes positioned relative to each other will form traversely extending tube passage ways which decrease in diameter as the tubes extend downwardly (e.g., from the upstream side of the multi module construct to the downstream side of said construct) such that the totality of the tube passageways resemble an inverted cone or funnel. This funnel-like configuration facilitates very fine filtration operations so as to prevent passage of all but the smallest target moieties. For example, the DNA helix has a diameter of about 2 nm, and many antibodies are 7 to 10 nm at their widest point.

Three modules 30A, 30B and 30C are arranged parallel with each other to create a three module filtering construct. A headspace "H" may exist above each module and each head space may be hermetically sealed or otherwise isolated from any other head space. Alternatively, the tubes of downstream modules may directly contact the downwardly facing surfaces of the porous substrate above them such that head space is eliminated or minimized.

An initial fluid 31 contacts a first filtering module 30A so as to remove relatively the largest particles in that fluid. A resulting first filtrate 33 then contacts a second filtering module 30B featuring nanotubes 12B having diameters smaller than those nanotubes 12A of the first filtering module 30A.

A second filtrate 35 is thereby generated as the first filtrate is subjected to the second filtering module 30B. This second filtrate 35 may be further subjected to a third filtering module 30C featuring nanotubes 12C with diameters smaller than the nanotubes 12B of the second module positioned above it. This generates a third filtrate 37. Additional modules can be added to further tune the final filtrate constituents.

The construct depicted in FIG. 3 provides a filter gradient. The extent of the gradient depends on the number of modules utilized.

It should be noted that the modular configuration depicted in FIG. 3 is for illustration purposes only. For example, the number of tubes mounted on each of the modules can differ from each other. Also, the tubes of an upstream module maybe aligned with tubes of a downstream module. Conversely, the tubes of an upstream module may be offset or not aligned with the tubes of a downstream module. Tubes of an upstream module 30A may be aligned with tubes of a downstream module 30C that is not directly adjacent to the upstream module, such that an intermediate module 30B is present with its tubes not aligned with either the immediately preceding upstream module or the its immediately following downstream module. This will confer a zig-zag effect of fluid flow within the construct to assure mixing and prevent clogging of the tubes.

Diameters of the tubes can be modified so that along with the aforementioned functionalization, hydrogen storage, redox reactions, gas ($CO_2$) treatment, and/or gas partitioning operations can be facilitated. The nanotube dimensions including outer-diameter, inner-diameter, and wall thickness can be tuned by electrospinning parameters including precursor viscosity, surface tension, electrospinning voltage, electrode geometry and metal salt concentration. Additional nanotube diameter control can be obtained by atomic layer deposition, where ultra-fine coating can be applied to the nanotubes and reduce the inner diameter to under 1 nanometer.

Diameters of the tubes may all be identical on the same membrane or they may vary at different regions of the membrane. For example, a left side of the membrane may feature tubes all having a first diameter, while a right side of the same membrane may feature tubes with a second diameter different than the first diameter.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A method for producing a membrane, the method comprising:
   a. placing nanotubes on a porous substrate;
   b. subjecting the nanotubes to a magnetic field for a time and at a magnetic field strength to cause the nanotubes to vertically align parallel with each other so as to define upstream ends and depending ends of the nanotubes while simultaneously causing the depending ends of the nanotubes to embed within the substrate; and
   c. applying nonporous polymer to the nanotubes and substrate in an amount to affix the nanotubes relative to each other and relative to the substrate wherein the polymer is applied at a thickness less than the lengths of the nanotubes, and
   d. etching the polymer to unblock the upstream ends of the nanotubes.

2. The method as recited in claim 1 wherein the magnetic field is removed after the polymer hardens.

3. The method as recited in claim 1 further comprising immersing the affixed tubes in an etchant.

4. The method as recited in claim 3 wherein the etchant cleaves chemical bonds between constituents of the polymer.

5. The method as recited in claim 3 wherein the etchant is a compound selected from the group consisting of enzymes, bases, acids, oxygen plasma, and combinations thereof.

6. A method for producing a membrane, the method comprising:
   a. placing tubes on a substrate;
   b. subjecting the tubes to a magnetic field for a time and at a magnetic field strength to cause the tubes to align parallel with each other while simultaneously causing depending ends of the tubes to embed within the substrate; and
   c. applying polymer to the tubes and substrate in an amount to affix the tubes relative to each other and relative to the substrate; and
   d. immersing the affixed tubes in an etchant, wherein the polymer is polyamide and the etchant is a mixture of proteases.

7. The method as recited in claim 6 wherein the polyamide comprises m-phenylenediamine and 1,3,5-benzene tricarbonyl chloride.

8. The method as recited in claim 6 wherein the mixture of proteases comprise *Streptomyces griseus* Protease A, *S. griseus* Protease B, and *S. griseus* Trypsin.

9. The method as recited in claim 1 wherein the substrate is a porous support selected from the group consisting of polysulfone, regenerated cellulose, poly(ethylene terephthalate) (PET), polyamide, alumina, silica, and combinations thereof.

10. The method as recited in claim 1 wherein the substrate defines pores that extend transversely through the substrate, wherein the pores have an upstream end and a downstream end.

11. The method as recited in claim 10 wherein the nanotubes align within the upstream end of the pores.

12. The method as recited in claim 2 wherein the substrate defines pores that extend transversely through the substrate and the polymer, once cured, maintains alignment of the nanotubes within the pores of the substrate.

13. The method as recited in claim 6 wherein the magnetic field is removed after the polymer hardens.

14. The method as recited in claim 6 wherein the etchant cleaves chemical bonds between constituents of the polymer.

* * * * *